United States Patent [19]
Robison

[11] Patent Number: 5,790,866
[45] Date of Patent: Aug. 4, 1998

[54] METHOD OF ANALYZING DEFINITIONS AND USES IN PROGRAMS WITH POINTERS AND AGGREGATES IN AN OPTIMIZING COMPILER

[75] Inventor: Arch D. Robison, Champaign, Ill.

[73] Assignee: Kuck and Associates, Inc., Champaign, Ill.

[21] Appl. No.: 388,271

[22] Filed: Feb. 13, 1995

[51] Int. Cl.$^6$ .................................................. G06F 9/45
[52] U.S. Cl. ........................... 395/709; 395/705; 395/708
[58] Field of Search .................................... 395/705, 706, 395/708, 709

[56] References Cited

U.S. PATENT DOCUMENTS

| | | | |
|---|---|---|---|
| 4,843,545 | 6/1989 | Kikuchi | 364/300 |
| 5,355,494 | 10/1994 | Sistare et al. | 395/700 |
| 5,448,737 | 9/1995 | Burke et al. | 395/700 |

OTHER PUBLICATIONS

*Compilers—Principles, Techniques, and Tools;* Addison–Wesley Series in *Computer Science;* Alfred V. Aho, Ravi Sethi, Jeffrey D. Ullman; Copyright ©1986 by Bell Telephone Laboratories, Incorporated; Published by Addison–Wesley Publishing Company; pp. 594–597; 624–639; 680–695.

*Primary Examiner*—Emanuel Todd Voeltz
*Assistant Examiner*—Kakali Chaki
*Attorney, Agent, or Firm*—Brinks Hofer Gilson & Lione

[57] ABSTRACT

A method for analyzing and optimizing programs that contain pointers and/or aggregates, such as found in the languages C, C++, FORTRAN-90, and Ada. The method applies to storage locations (lvalues) and values (rvalues) computed by expressions.

Data-flow analysis is performed on two levels. The bottom level determines when an rvalue computed at one point in a program is the same if recomputed at a later point in the program. The top level computes reaching definitions, based upon information provided by the bottom level. Each destination lvalue may be designated by an arbitrary rvalue (pointer-expression). Splitting of data-flow analysis into two levels allows computation of reaching definitions that involve assignments to lvalues with designating rvalues that are arbitrary expressions.

Furthermore, for aggregate lvalues, which themselves may contain components that are pointers to other aggregates, data-flow analysis is done on a component-by-component basis. Data-flow analysis is then used to forward-substitute definitions and remove "dead" assignments.

13 Claims, 6 Drawing Sheets

Microfiche Appendix Included
(1 Microfiche, 68 Pages)

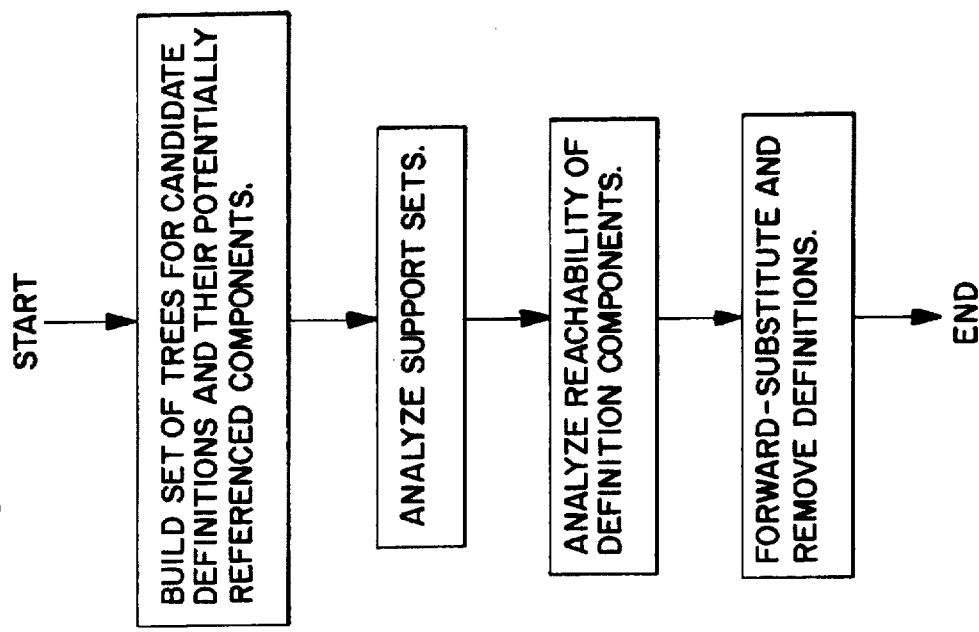
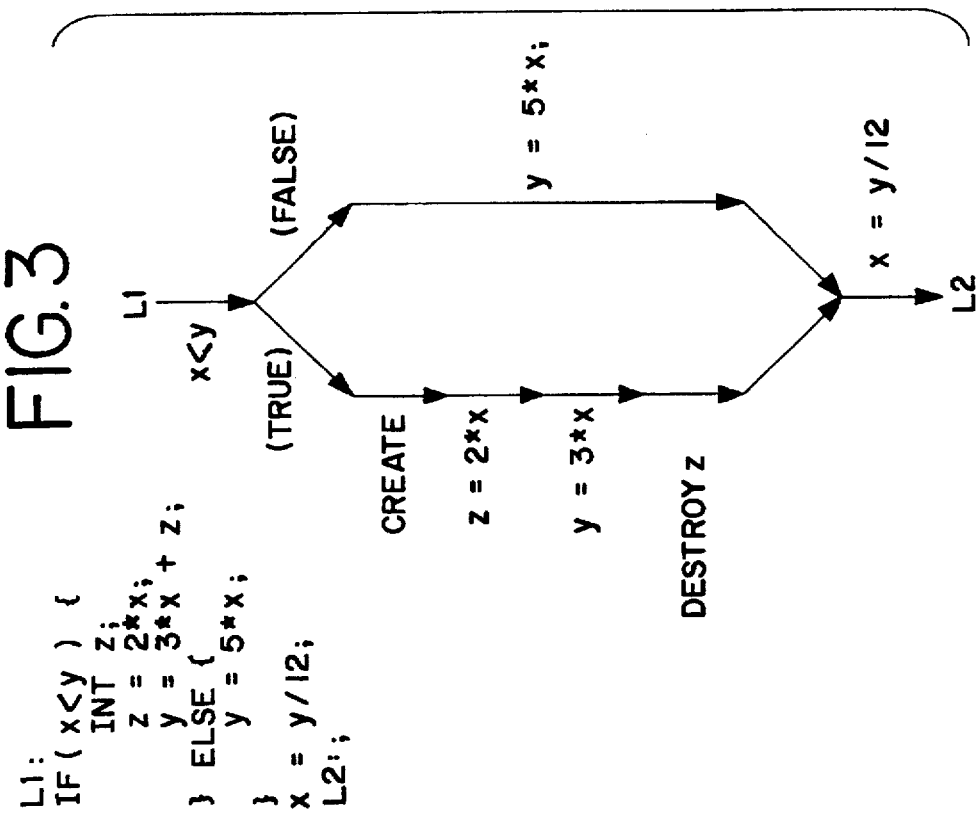

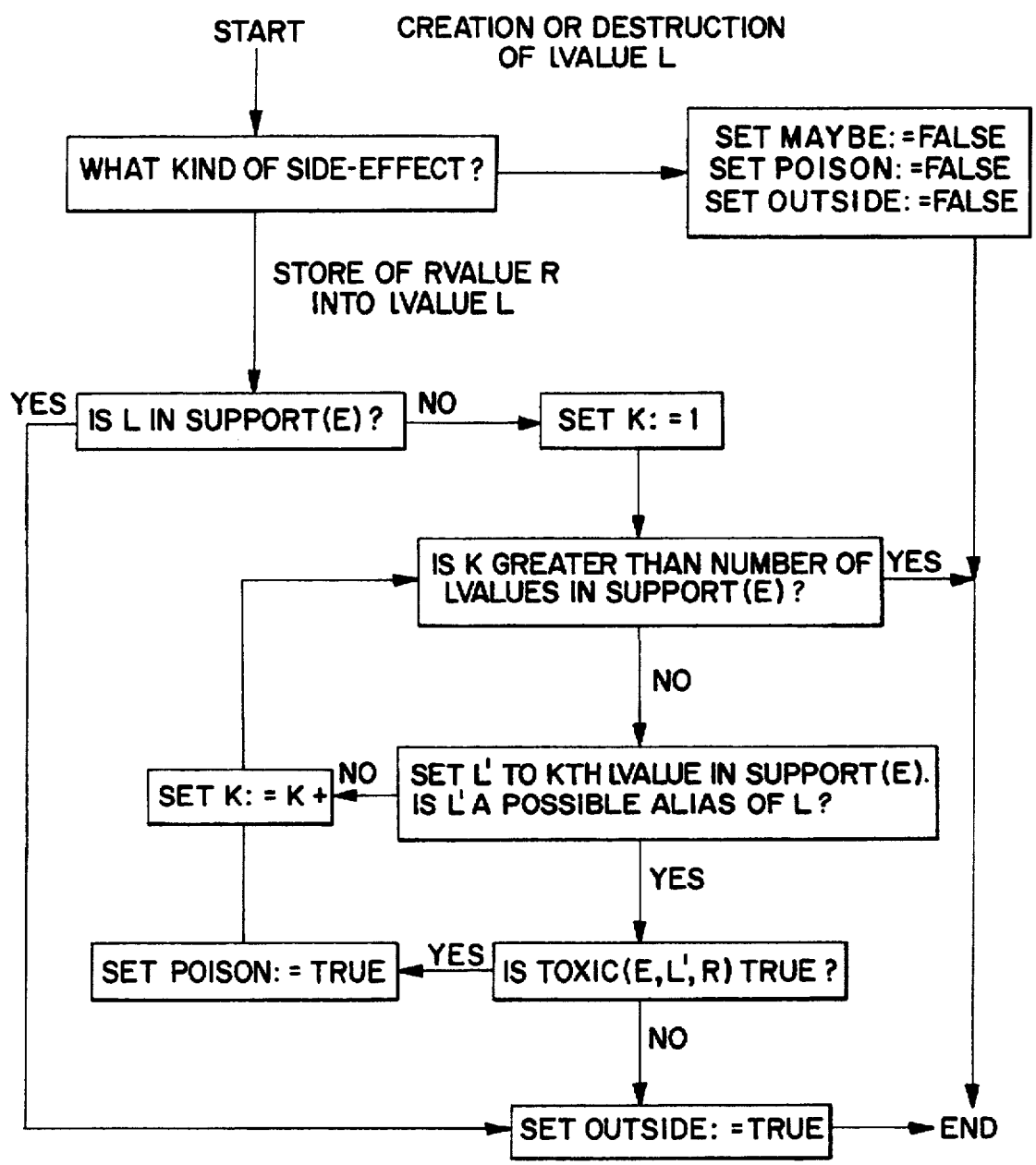

METHOD OF ANALYZING DEFINITIONS AND USES IN PROGRAMS WITH POINTERS AND AGGREGATES IN AN OPTIMIZING COMPILER

REFERENCES

Aho, Alfred V. and Sethi, Ravi and Ullman, Jeffrey D., "Compilers, Principles, Techniques, and Tools," Addison-Wesley, 1986.

MICROFICHE APPENDIX

Attached to this application is a microfiche appendix having one microfiche with 68 frames.

BRIEF DESCRIPTION OF THE DRAWINGS

FIG. 3 shows an example C program and its corresponding flow-graph.

FIG. 4 is a broad overview of the analysis and transformations performed by the invention.

FIG. 7 is a block diagram representing the method that this invention uses to compute an IS_SAME sub-transfer-function for a side-effect.

TECHNICAL FIELD

Figure 1:
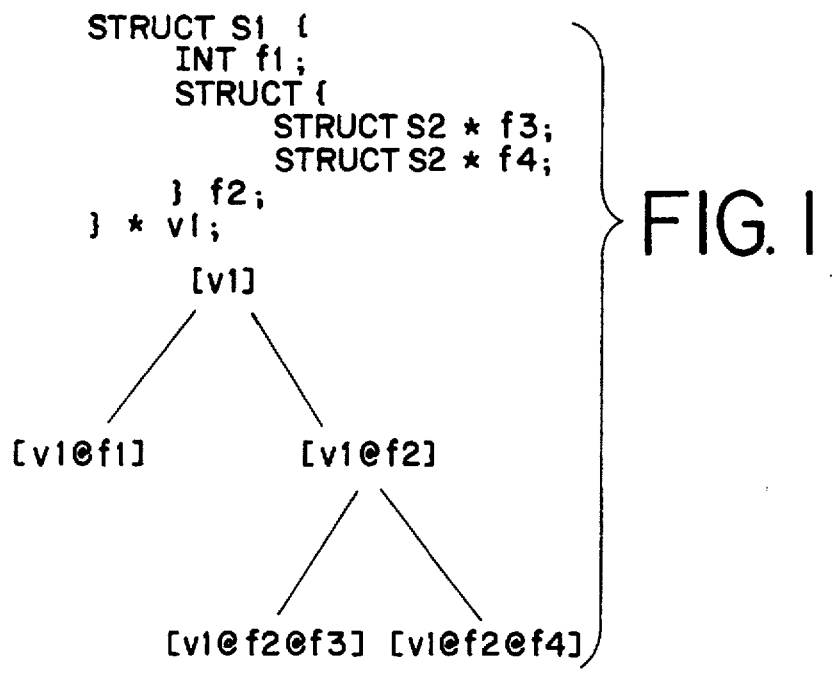
FIG. 1 shows a declaration in C and the corresponding region-tree.

The present invention generally relates to software compiler technology. More particularly, the present invention relates to a method for constructing definition-use information for lvalues that may be aggregates and/or referenced through pointer expressions.

Early programming languages such as FORTRAN have scalar variables and arrays. Consequently, early optimizers focused on scalars and arrays. Two important optimizations for scalars are removing computations of unused values (dead-code removal) and moving computations forward (forward-substitution). Forward substitution is also called "forward propagation" in the literature. A special case of forward-substitution is "copy propagation". Copy propagation is simply forward-substitution of a definition whose right-hand-side is a variable.

Newer programming languages such as C++, FORTRAN-90, and Ada have aggregates and pointers for which the early optimizers are inadequate.

PRIOR ART

As described in Aho, Sethi, and Ullman, *Compilers: Principles, Techniques and Tools*, Addison-Wesley (1986), optimizing compilers in the prior art solve data-flow problems to create definition-use chains, remove dead code, and to do forward-substitution.

The data-flow problems used by prior art for forward-substitution and dead-code removal are listed below.

Forward-substitution: For each definition D, a solution to the following data-flow problem is computed: "Does definition D "always" reach a given use and does its right-hand-side evaluate to the same value at the point of use as the point of definition?" If the answer is yes, then the use of the definition's left-hand-side may be replaced by the expression for its right-hand-side.

Dead-code removal: For each definition D, a solution to the following data-flow problem is computed: "Does definition D ever reach a given use?" If the answer is no, then the definition may be deleted from the program.

In the prior art, these analyses are applied to each scalar variable.

SUMMARY OF THE INVENTION

It is the primary object of the present invention to provide an efficient method for analyzing definitions and uses of lvalues that are components of aggregates and/or referenced by pointer expressions. This method enables optimization of programs containing these kinds of definitions. In particular, the invention forward-substitutes and/or removes assignments to individual components of an aggregate.

It is a further object of the invention to split data-flow analysis into two levels. The bottom-level analyzes when pointers change, the top-level analyzes the relationships between definitions and uses. Prior art employs only an inferior version of the top-level solver.

It is a further object of the invention to formulate a single top-level data-flow problem whose solution can be employed to perform both forward-substitution and dead-code removal. The invention solves the data-flow problem "does a definition ever reach a use?", and applies the answer to both forward-substitution and dead-code removal. Prior art performs dead-code removal in the same manner, but performs forward-substitution by solving a different data-flow problem "does a definition always reach a use?". Solving a single problem is advantageous in that it reduces both complexity and compilation time. Furthermore, forward-substitution often creates opportunities for removing dead-code in the same pass.

It is a further object of the invention to specifically ignore certain assumed assignments via assumed aliases, by observing how the assigned value might be used. The technique enables superior optimization of programs containing aliases, without presuming the absence of aliases in the manner of prior art.

It is a further object of the invention that it forward-substitutes multiple definitions that reach a use, when the definitions have matching right-hand sides. Prior art forward-substitutes when only a single definition reaches a use.

It is a further object of the invention to do component-by-component analysis of aggregates based on the smallest components referenced rather than the smallest distinct component defined by the declared type of the aggregate.

DETAILED DESCRIPTION OF A PREFERRED EMBODIMENT OF THE INVENTION

An "aggregate" is a group of zero or more regions of memory that may be referenced as a single entity, or by specified components. The regions may overlap, as found for example, in "unions" in the programming languages C and C++. Aggregates may contain aggregates themselves. A "sub-component" of an aggregate is a component of the aggregate or (recursively) a component of a sub-component. Examples of aggregates in the programming languages C and C++ are structs, unions, and arrays. Examples of aggregates in the programming languages Ada and Pascal are records and arrays. Examples of aggregates in the programming language Fortran-90 are structures. The invention applies to similar constructions in other programming languages.

An "rvalue" is a value (bit-pattern). An "rvalued expression" is an expression that, when evaluated, yields an rvalue. An "lvalue" is region of memory denoted by either a program variable, a designating rvalue, or a component of an aggregate lvalue. The contents of an lvalue are an rvalue. An "lvalued expression" is an expression, that when evaluated, yields an lvalue. A "designating rvalue" is a pointer expression that points to an lvalue. Some expressions can be both rvalued and lvalued, depending upon context. For example, in the statement $$J:=J+1$$

the J on the left-hand-side denotes an lvalue that is stored into. The J on the right-hand-side denotes an lvalue from which is loaded an rvalue. The designating rvalue for lvalue L is denoted ADDRESS(L).

The following notations are used for descriptive purposes. For a rvalue P that points to an lvalue, we use [P] to denote the lvalue designated by rvalue P. For a rvalue P that points to an aggregate of a type with a component F, we use P@F to denote a pointer to the component within the aggregate pointed to by P. The operator @ is left-associative; thus, P@F@G denotes a pointer to component G of component F of the aggregate pointed to by P. Notice that in this case P@F denotes a pointer to a component that is itself an aggregate. The notation [P] corresponds to (*P) in the language C. The notation P@F corresponds to (&(*P).F) in the language C. The notation described in this paragraph is not part of the invention, but merely simplifies discussion of it. In particular, the notation P@F is intended to convey the notion that P@F is a pointer computed by adjusting pointer P, whereas the C notation (&(*P).F) introduces a redundant indirection (*P) that is "canceled" by the C address-taken operator &.

A "definition" is the assignment of a right-hand-side rvalue to a left-hand-side lvalue. The "support" of an rvalued expression E is the "set" of lvalues whose contents are read, when the expression E is evaluated. The "support" of an lvalue is the support of the designating rvalue, or the empty set if the lvalue has no designating rvalue. The support of expression E is denoted SUPPORT(E). For example, consider the definition below.

$$[[v1@f2@f3]@f5]:=[v2@f2@f4]@f6]+3.14$$

1. The left-hand-side lvalue is "[[v1@f2@f3]@f5]".
2. The rvalue designating that lvalue is "[v1@f2@f3]@f5".
3. The right-hand-side rvalue is "[[v2@f2@f4]@f6]+3.14";
4. The support of the left-hand-side lvalue is the set {v1,[v1@f2@f3]}
5. The support of the right-hand-side rvalue is the set {v2,[v2@f2@f4], [[v2@f2@f4]@f6]}

The support of an rvalue may be empty. For instance, the support for an rvalued expression E is empty if expression E contains no lvalues.

The preferred embodiment employs a data-structure called a region-forest. A "region-forest" is a set of "region-trees". A "region-tree" is a tree structure that represents the nested containment of components in an aggregate lvalue. Each node in a region-tree, called a "region-node", corresponds to a component of an aggregate. Each region-node, except the root, has a unique parent node. For each lvalue L and region-forest F, the corresponding region-node, if it exists, is denoted NODE(L). The parent of NODE(L) corresponds to the innermost aggregate that properly contains the lvalue L. In other words, if a region-node NODE(M) corresponds to an aggregate lvalue M, then the children of NODE(M) correspond to the components of lvalue M. The root node of a region-tree has no parent, and corresponds to an lvalue that has no containing lvalue. Given an lvalue L, the root node of the region-tree that denotes its outermost containing lvalue is denoted ROOT(L). Notice that for any pointer p with component x, the following is always true: ROOT([P])=ROOT([P@X]). A point not to be overlooked in a correct embodiment is that for a given region-tree, there can be one or more lvalues L such that ROOT(L) exists but NODE(L) does not.

Figure 2:
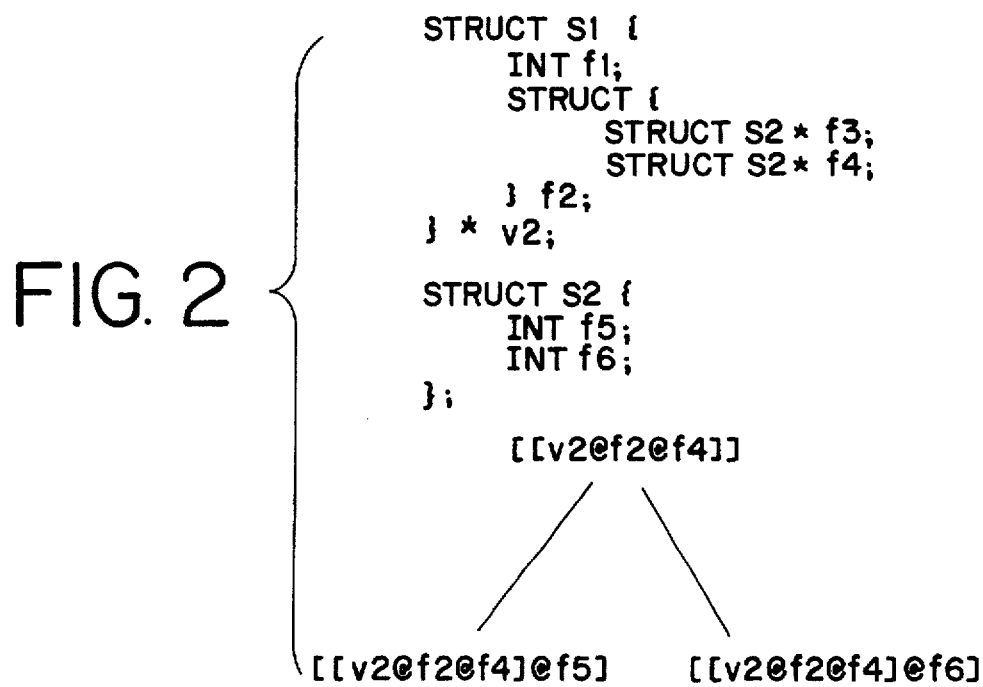
FIG. 2 shows a C declaration and corresponding region-tree with a root that is a component of an aggregate.

FIG. 1 shows a declaration in the programming language C and the corresponding region-tree. An essential point of the invention is that the lvalue corresponding to root need not be a pointer variable, but may be designated by an arbitrary rvalue. FIG. 2 shows such a region-tree.

The preferred embodiment employs a predicate TOXIC (L,R) that for any lvalue expression L and rvalue expression R, returns true or false. The meaning of TOXIC(L,R) is that if the program to be transformed assigns L:=R, then the present invention may ignore whatever effects the assignment would actually have on the subsequent evaluation of L. Increasing the variety of assignments that may be ignored generally improves optimization. For example, many programs are known "a priori" to not assign floating-point values to pointers, so for such programs it is advantageous to make TOXIC(L,R) return true when L is a pointer and R is a floating-point lvalue.

It must be stressed that TOXIC does not make an aliasing assertion, only an assertion about use of a stored rvalue. For example, suppose there is an assignment L:=R. If for some other lvalue L', TOXIC(L',R)=true, it does not imply that L' and L are not aliased, merely that the optimizer may ignore possibly effects of the assignment on L'. The use of the TOXIC predicate enables the invention to optimize correctly in cases where prior art based on simple aliasing restrictions cannot.

The preferred embodiment employs a flow-graph representation of a program in which edges of the graph represent transfer of control, evaluation of expressions, and/or creation/destruction of local variables. Vertices correspond to labels and unlabeled points of execution between statements. This kind of flow-graph departs from common practice primarily in that side-effects are represented as edges instead of vertices. This kind of flow-graph is not necessary for the invention, but simplifies minor details of its preferred embodiment. FIG. 3 shows an example C program and the corresponding flow-graph. Each flow-graph has two distinguish nodes INITIAL and TERMINAL that represent program entry and exit respectively.

Some functions computed by the invention return a three-tuple of bits, which are named MAYBE, POISON, and OUTSIDE. If T is such a tuple, the individual bits are denoted as T.MAYBE, T.POISON, and T.OUTSIDE respectively.

FIG. 4 shows an overview of the steps applied by the invention to a program and its associated flow-graph. FIG.

5 shows the steps in more detail. The application of all these steps is considered a single "pass" of the invention. These steps are as follows.

1. Find all candidate definitions. These are assignments or initializations of lvalues such that evaluation of the assignment or initialization causes no other side effects. Obviously, assignments or initializations that have other side effects may be rewritten as multiple statements so that the relevant assignment or initialization is separated into a separate statement without other side-effects.

Embodiments of the invention may restrict definitions further according to other criteria, such as the complexity of the right-handside.

2. Build the region-forest CANDIDATE_REGION_FOREST for the candidates. Begin by setting CANDIDATE_REGION_FOREST to empty. Each candidate is of the form L:=R, where the left-hand side L is an lvalued-expression and the right-hand side R is an rvalued-expression. Add a node corresponding to L to the CANDIDATE_REGION_FOREST. Add any extra nodes that are necessary to connect the new node to the root of a region-tree. This may require adding a new root node to CANDIDATE_REGION_FOREST.

3. Refine the region-forest CANDIDATE_REGION_FOREST to the granularity of the smallest components of definitions that are potentially used. This step proceeds by scanning the program for loads and/or stores of components whose outermost containing lvalue is already represented in CANDIDATE_REGION_FOREST. If the tree does not yet have a node corresponding to the loaded/stored lvalue, a node is added to the tree. Adding the node requires adding intermediate nodes to connect it with the rest of the tree when the node is not a child of an existing node. The components of each lvalue L that correspond to the leaves in the final tree are called the "leaf-components" of L.

4. Construct the IS_SAME problems. An IS_SAME problem is the question:

Given set of rvalued expression E, and two points x and y in the flow-graph, if expression E is evaluated at point y, does it yield the same rvalue as evaluation of the expression would have at the most recent encounter of point x would have yielded? If x and y are identical, then "most recent encounter of point x" is taken to mean the previous encounter.

An answer to the IS_SAME problem is denoted IS_SAME(E,x)(y), where IS_SAME(E,x)(y) returns a three-tuple of bits (MAYBE,POISON,OUTSIDE). Each bit is either true or false. The curried notation is employed so that IS_SAME(E,x) denotes a function from vertices to tuples (MAYBE,POISON,OUTSIDE). Solution of an IS_SAME problem is essentially computation of the function IS_SAME(E,x).

The informal meanings of the three bits in the answer are as follows.

a. If MAYBE=false, then for SUPPORT(E) may contain an uninitialized lvalue.

b. If POISON=true, then some lvalue L' in SUPPORT(E) may have been modified (since x was most recently encountered) by an assignment of the form L:=R, where L' is a possible alias such that TOXIC(L',R)= true.

c. If OUTSIDE=true, then some lvalue L may have been modified (since x was most recently encountered) in a manner not covered by part b.

There are two IS_SAME problems for each definition: one for the right-hand-side rvalue and one for the designating rvalue for the left-hand-side. For a definition L:=R on edge D, these are written IS_SAME(R,tail(D)) and IS_SAME(ADDRESS(L),tail(D)) respectively. Each IS_SAME problem is constructed via the following steps.

a. Compute the support SUPPORT(E) of the expression E.

b. Compute the function IS_SAME_TRANSFER(E,x)(S) for each edge S.

Figure 6:
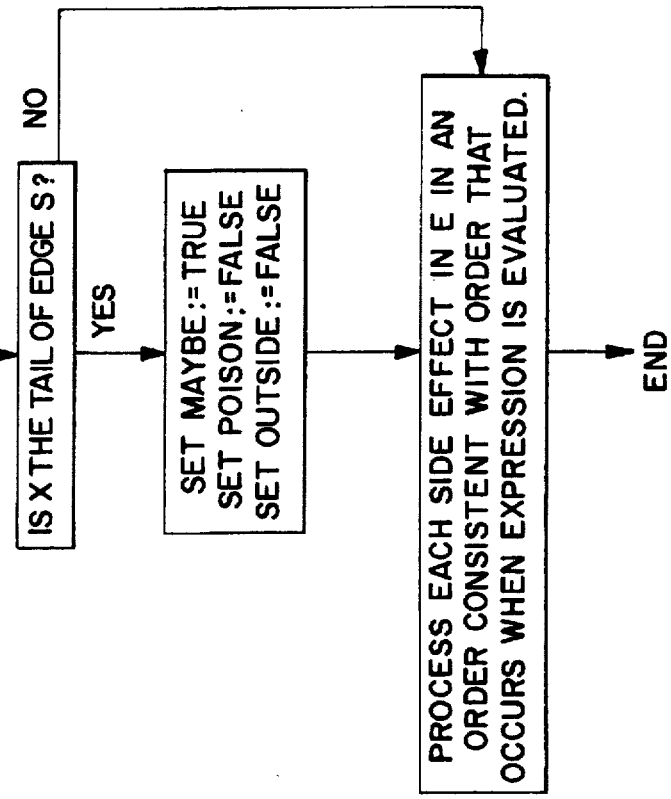
FIG. 6 is a block diagram representing the method that this invention uses to compute the IS_SAME transfer-function.
Figure 5:
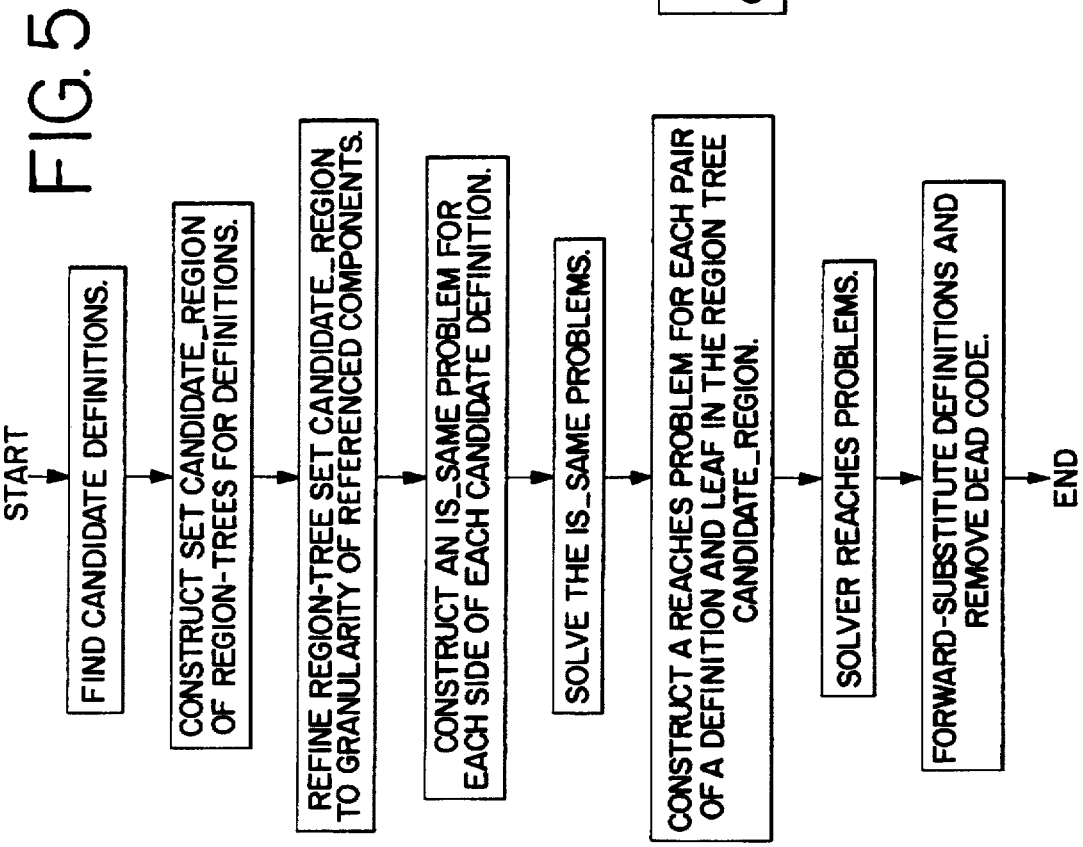
FIG. 5 is a fine overview of the analysis and transformations performed by the invention.

The function IS_SAME_TRANSFER is a transfer-function associated with each edge S of the flow-graph. The transfer-function is computed by composing sub-transfer-functions as shown in FIG. 6. There are sub-transfer-functions corresponding to "leaving x" and side-effecting operations in S. The resultant transfer-functions are composed in an order consistent with the order that the various side effects would occur when the expression is evaluated.

The sub-transfer-functions are described here as processes that given a bit-tuple (MAYBE,POISON,OUTSIDE), which represents the argument to the sub-transfer-function, modify the bits to yield the result of the function.

The sub-transfer-function for "leaving x" is:

a. If vertex x is tail(S), then set MAYBE:=true, POISON:=false, and OUTSIDE:=false, otherwise leave MAYBE, POISON, and OUTSIDE unchanged.

The side-effects considered are stores, lvalue creation, and lvalue destruction.

For a store operation that stores an rvalue R into an lvalue L, the steps for computing the corresponding IS_SAME sub-transfer-function are listed below, and shown in FIG. 7.

b. If L is in SUPPORT(E), then set OUTSIDE:=true and quit; otherwise continue to step c.

c. For each lvalue in L' in SUPPORT(E) that is a possible alias of L, either set POISON:=true if TOXIC(L',R) is true, or set OUTSIDE:=true if TOXIC(L',R) is false. An optional refinement is to quit when OUTSIDE becomes true instead of inspecting more possible aliases, because OUTSIDE=true represents the worst-case situation.

For an operation that is the creation or destruction of an lvalue L, the steps are:

d. Set MAYBE:=false, POISON:=false, and OUTSIDE:=false.

5. Run the bottom-level solver to solve the data-flow equations for the IS_SAME problems. The data-flow equations for an IS_SAME problem IS_SAME(E,x) can be solved within the generalized data-flow framework described by Aho et al. [p.680–694] by specializing the framework as follows:

a. The set of values V to be propagated are the three-bit tuples (MAYBE,POISON,OUTSIDE) associated with each vertex.

b. The set of transfer-functions F from V to V are the transfer-functions IS_SAME_TRANSFER(E,x)(S) described in step 4.

c. The binary meet operation is bitwise-OR, that is MEET ((M1,P1,O1),(M2,P2,O2))=(M1/M2, P1/P2, O1/O2), where "|" denotes the boolean OR operation.

d. The possible three-tuples (MAYBE,POISON, OUTSIDE) form a lattice in which the top element is (false,false,false).

Those skilled in the art will recognize that a variety of techniques exist for solving data-flow equations, as for example, described by Aho et al. How the data-flow equations are solved is not part of the invention. The invention concerns only how the equations are formulated and how their solution is applied.

6. Construct the REACHES problems. For each definition D (of the form L:=R), there are one or more REACHES problems. There is one problem for each leaf in the tree REGION_CANDIDATE_SET that corresponds to a component or sub-component of L. Let L.c denote a component or sub-component of L, where L is the left-hand-side of a definition. A REACHES problem is denoted as REACHES(D,c)(y), and is the question:

When vertex y is encountered, does the lvalue assigned to L.c by the most recent encounter of vertex head(D) ever reach vertex y?

The answer to a REACHES problem is a three-bit tuple (MAYBE,POISON,OUTSIDE). The REACHES problem is a data-flow problem that the invention specifies by defining a transfer function REACHES_TRANSFER. The transfer-function REACHES_TRANSFER for L.c with respect to an edge S and definition on edge D is denoted REACHES_TRANSFER(L,c)(S). It is computed by computing a sub-transfer-function for each store operation in S and composing the resultant sub-transfer-functions in an order corresponding to an order in which the store operations would be executed.

Figure 8:
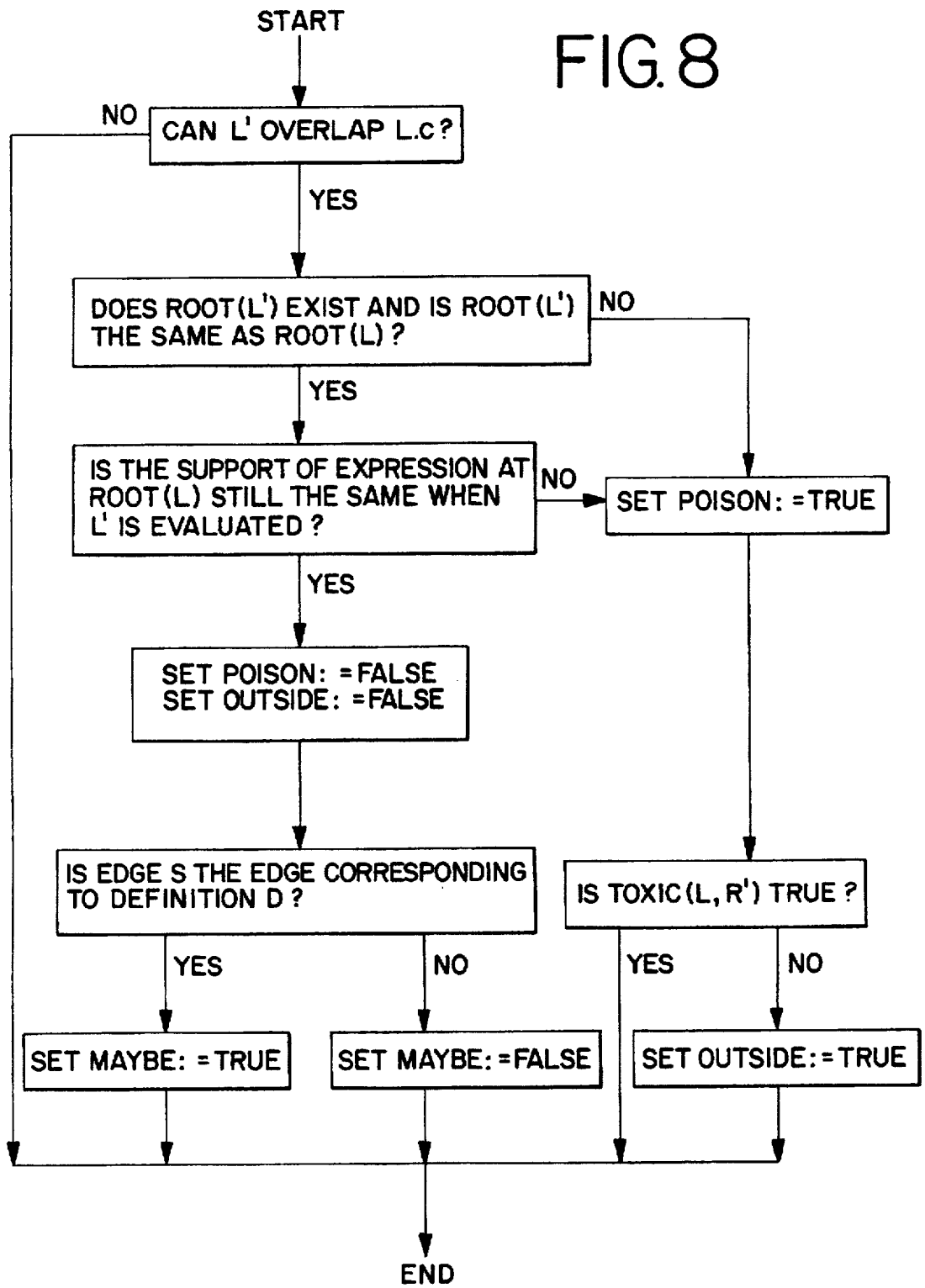
FIG. 8 is a block diagram representing the method that this invention uses to compute the REACHES transfer-function.

Let L' denote the lvalue stored into by a particular store. Then the steps for computing the corresponding REACHES sub-transfer-function are listed below and shown in FIG. 8.

a. If the memory region for L' cannot overlap L, then consider the store no further. Otherwise go to step b.
b. Look up ROOT(E) in CANDIDATE_REGION_SET. If ROOT(L') exists and is the same region-tree node as ROOT(L), goto step c. Otherwise go to step e.
c. Determine whether the lvalues in the support for the store will always have the same values when the store is executed as they had when the definition was executed. To accomplish this, let T=IS_SAME (SUPPORT(E').tail(D)) (tail(S)), where E' is the expression associated with ROOT(E). If T.MAYBE is true and T.OUTSIDE is false, go to step d. Otherwise go to step e.
d. Set POISON:=false and OUTSIDE:=false. If edge S corresponds to the statement with definition D, then set MAYBE:=true, otherwise set MAYBE:=false.
e. Set POISON:=false. If the store operation may store a value R' into L (either explicitly or via an alias), and TOXIC(L,R') is not true, then set OUTSIDE:=true, otherwise leave OUTSIDE unchanged.

In step (a), "cannot overlap" can be determined by many different methods independent of the invention. For example, the memory regions for distinct program variables never overlap, and regions pointed to by pointers never overlap variables that are not the targets of pointers.

Some lvalues that may have assigned values before the program begin execution. These lvalues are handled by setting the OUTSIDE bit to true for the associated. Calls are handled by estimating what kinds of side-effects they might execute. Those skilled in the art will recognize a variety of techniques for such estimates.

7. Run the top-level solver to solve the data-flow equations for the REACHES problems. The data-flow equations for a REACHES problem REACHES (E,x) can be solved within the generalized data-flow framework described by Aho et al. [p.680–694] by specializing the framework as follows:

a. The set of values V to be propagated are the three-bit tuples (MAYBE,POISON,OUTSIDE) associated with each vertex.
b. The set of transfer-functions F from V to V are the transfer-functions REACHES_TRANSFER(D,c)(S) described in step 6.
c. The binary meet operation is bitwise-OR, that is MEET ((M1,P1,O1),(M2,P2,O2))=(M1/M2, P1/P2, O1/O2), where "I" denotes the boolean OR operation.

d. The possible three-tuples (MAYBE,POISON, OUTSIDE) form a lattice in which the top element is (false,false,false).

Those skilled in the art will recognize that a variety of techniques exist for solving data-flow equations, as for example, described by Aho et al. How the data-flow equations are solved is not part of the invention. The invention concerns only how the equations are formulated and how their solution is applied.

It should be obvious to those skilled in the art of programming that much code can be shared between the solvers for the IS_SAME and REACHES problems, since both concern three-bit tuples of the form (MAYBE,POISON, OUTSIDE).

8. Replaces uses with right-hand-sides of definitions according to the analysis performed by steps 1–7. Scan the program for lvalues U that are read (as opposed to stored into), and such that NODE(U) exists in the CANDIDATE_REGION_FOREST.

Figure 9:
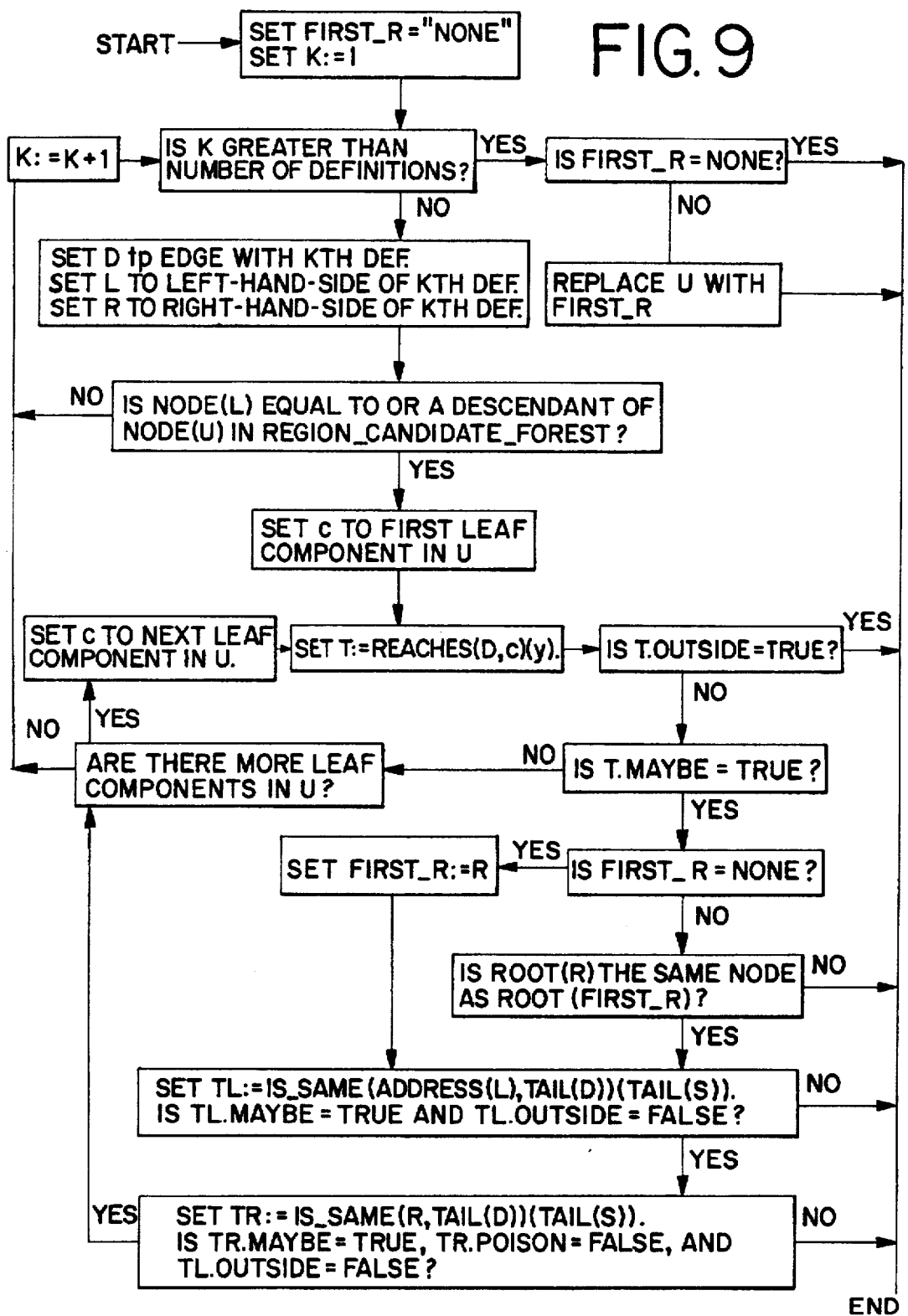
FIG. 9 is a block diagram representing the method that this invention uses to decide whether to forward-substitute definitions into a use.

Each such use of an lvalue U is analyzed for possible substitution as shown in FIG. 9. Let S be the flow-graph edge that corresponds to the expression with use site U. The analysis begins by setting FIRST_R to a special value "none" distinct from any expression. For each candidate definition found in step 1., the following steps are executed:

a. Set D to the edge containing the definition. Set L and R to the left and right hand sides respectively of the definition.
b. If NODE(L) is equal to NODE(U) or a descendent of NODE(U) in REGION_CANDIDATE_FOREST, continue to step c. Otherwise, do not consider the current definition further, because the definition under consideration never reaches the use U.
c. Execute steps d–i for each leaf-component c in U.
d. Set T:=REACHES(D,c)(tail(S)).
e. If T.OUTSIDE is true, the value of U may be set by something that is not a definition under consideration. Thus substituting into U is not safe and consideration of use U ends.
f. If FIRST_R="none", this is the first reaching definition considered, and FIRST_R should be set to R. Otherwise, compare ROOT(R) with ROOT(FIRST_R). If they differ, then there are two reaching definitions with different right-hand-sides, and substituting into use U is not possible.
g. Set TL:=IS_SAME(ADDRESS(L),tail(D))(tail(S)). If TL.MAYBE is true and TL.OUTSIDE is false, then continue to step h. Otherwise the support for L may change between the point of definition and use, and substitution into U is not possible. The POISON bit can be ignored since the use U evaluates L, and thus if the POISON bit is set, it represents a side-effect that the present invention is allowed to ignore by definition of TOXIC.
h. Set TR:=IS_SAME(R,tail(D))(tail(S)). If TR.MAYBE=true and TR.POISON=false and TR.OUTSIDE=false, then continue to step i. Otherwise, the support for R may change between the point of definition and use, and substitution into U is not possible. The POISON bit must be checked since U does not necessarily evaluate R.
i. Consider the next leaf component of U if there is one.

After all definitions and their relevant components are considered, the contents of FIRST_R are inspected. If FIRST_R is not the special value "none", then the component of R corresponding to U may be substituted into U.

9. This step deletes all unused definitions.

A definition L:=R on edge D is considered used by an edge S if the corresponding MAYBE bit for tail(S) is true. Mark a definition as used if it is used by an edge that is not a definition. are used by edges that are not definitions. Mark a definition as used if it is used by another definition that is marked used. Continue marking definitions until no further definitions can be marked.

Delete all definitions that are not marked used. The invention has the discretion to warn the programmer of the nature of the definition being deleted.

10. An optional step of the invention is to hoist invariant expressions, as explained later in this section.

Applying multiple passes of the invention to analyze and transform again may yield results superior to a single pass.

I explain below the deficiences of prior art and why the present invention is superior.

Prior art uses just a single solver, corresponding to the top-level solver of the current invention. Prior art limits itself to considering definitions for which the support of the left-hand-side is invariant (e.g. program variables), or inaccurately considers modification of the aforementioned support as modification of the left-hand-side lvalue itself. The present invention plainly separates flow-analysis of definitions from flow-analysis of the support of the left-hand-side, and thus can analyze arbitrary lvalues.

Since prior art does not analyze arbitrary lvalues, it can neither report on the pattern of their definition and use, nor transform such patterns.

Prior art requires separate passes for forward-substitution and removing dead-code. The reason is that prior art does forward-substitution by doing data-flow analysis on the following problem for each definition D and use U: "Does the value assigned by definition D always reach use U and does the corresponding support for the right-hand-side also reach definition D?". The present invention does data-flow analysis on two problems:

1. "Does the value assigned by definition D ever reach use U?"
2. "Is the right-hand-side support the same at the use as at D?"

It is important to note how problem (1) differs from prior art: "always reach" in the prior art is replaced by "ever reach" in the invention. Thus in the invention, part (1) for forward substitution is identical to the data-flow problem that is solved to remove dead assignments and the same solution to the problem can be used for both forward-substitution and removal of dead assignments.

The invention can forward-substitute multiple definitions into a single use when all the definitions have matching right-hand-sides, because the problem formulated in part 1 is "ever reach". Prior art formulates the different problem "always reach". For a definition to "always reach", no other definition can reach, and thus forward-substitution of multiple definitions is impossible in prior art.

The part of the invention related to formulating the IS_SAME data-flow problem can also be applied to hoisting invariant expressions from loops in a manner superior to prior art. In this regard, the invention can identify more lvalues for hoisting than can prior art. An lvalue can be hoisted if it does not change during execution of the loop. The steps for determining whether component c of an lvalue L, referenced at edge S within the loop, is invariant during execution of a loop are listed below.

1. Build an IS_SAME problem IS_SAME(L,c).
2. Solve the IS_SAME problem. The problem need not be solved for the entire flow-graph. Solving it only for the sub-graph involving the loop and header vertex is sufficient.
3. Set T:=IS_SAME(L,c)(tail(S)). Then component c of lvalue L does not change (or the changes can be ignored) if T.MAYBE=true and T.OUTSIDE=false.

Notice that T.POISON is ignored, because the support of L is evaluated by the expression corresponding to edge S.

The use of the POISON bit and related predicate TOXIC enable the invention to identify some lvalues as invariant that prior art cannot. For example, many programs are known "a priori" to not assign floating-point values to pointers, so for such programs it is advantageous to make TOXIC(L,R) return true when L is a pointer and R is a floating-point lvalue. Then if all stores in a loop are to lvalues of a floating-point type, the invention identifies all lvalues of a pointer-type as invariant.

The predicate TOXIC and the POISON bit in the solver also relate to dependence graphs. Prior art can achieve the same effect by building a dependence graph, and then removing all assumed flow dependences that were assumed because of a possible assignment of an rvalue R to an lvalue L and TOXIC(L,R)=true. Essentially, the invention's POISON bit enables it to ignore such dependences without ever building a dependence graph.

Having thus described my invention, what I claim as new, and desire to secure by Letters Patent is:

1. A method for analyzing definitions and uses in a compiler including a two-level analyzer having both top and bottom analyzer levels, comprising the steps of:

analyzing a support of an lvalue to generate a solution to an is same problem with the bottom level analyzer; and using the solution generated by the bottom-level analyzer to solve a definition reaches problem with the top level analyzer.

2. The method defined in claim 1, wherein the lvalues comprise aggregates.

3. The method defined in claim 2, further comprising the step of providing for component-wise analysis of definitions that subdivides the aggregates into the smallest component referenced, not the smallest component possible.

4. The method of claim 2 wherein the aggregates comprise at least one component and the at least one component is analyzed separately.

5. The method defined in claim 1, wherein the lvalues are referenced by pointer expressions.

6. The method defined in claim 1, further comprising the step of identifying unused assignments to lvalues and reporting to the programmer the nature and location of these conditions.

7. The method defined in claim 1, further comprising the step of forward-substituting definitions that have lvalued left-hand sides.

8. The method defined in claim 1, further comprising the step of removing unused definitions that have lvalued left-hand sides.

9. The method defined in claim 1, further comprising the step of hoisting invariant expressions out of loops.

10. The method defined in claim 1, further comprising the step of exploiting a single flow-analysis pass for both removing unused assignments and forward-substitution.

11. The method defined in claim 1, further comprising the step of constructing definition-use information that allows some assumed dependencies to be ignored, without constructing a complete dependence graph.

12. The method defined in claim 1, further comprising the step of identifying invariant values within loops that allows some assumed dependencies to be ignored, without constructing a complete dependence graph.

13. The method defined in claim 1, further comprising the step of providing for forward-substitution of multiple definitions that reach a single use of an lvalue, when all of the reaching definitions have matching right-hand sides.

* * * * *